United States Patent Office 2,789,967
Patented Apr. 23, 1957

2,789,967

INTERPOLYCARBONATES FROM 1,4-BIS (β-HYDROXYETHYL)-BENZENE-BIS (ALKYL OR ARYL CARBONATES)

Delbert D. Reynolds and John Van Den Berghe, Rochester, N. Y., assignors to Eastman Kodak Company, Rochester, N. Y., a corporation of New Jersey No Drawing. Application February 2, 1954,
Serial No. 407,806

18 Claims. (Cl. 260—47)

This invention relates to highly polymeric linear interpolycarbonates prepared by the co-condensation in the presence of a specific ester-interchange catalyst of a 1,4-bis(β-hydroxyethyl)-benzene-bis-(alkyl or aryl carbonate) mixed together with another copolymerizable bis-(carbonate) monomer as described below. These starting materials are hereinafter collectively referred to as bis-(carbonate) monomers and are separately referred to as either primary or as copolymerizable bis-(carbonate) monomers. This invention also includes interpolycarbonates prepared when employing mixtures of several of the primary bis-(carbonate) monomers or of the copolymerizable bis-(carbonate) monomers. Furthermore, this invention relates to the processes involved in preparing the polymers.

It is an object of this invention to provide unusually superior highly polymeric linear interpolycarbonates which are valuable in preparing fibers, film, etc. as described herein. An additional object of this invention resides in providing a process for converting the mixed starting materials into the interpolycarbonates. Other objects will become apparent hereinafter.

Linear polycarbonates prepared by the self-condensation of a 1,4-bis-(β-hydroxyethyl)-benzene-bis-(alkyl or aryl carbonate) or mixtures thereof have been described in our copending application filed on December 8, 1953, Serial No. 397,037. The products of the previously filed application are highly polymeric polycarbonates which possess high intrinsic viscosity and high melting points such that they can be extruded to form films, fibers, and the like which can be mechanically worked and heat-set to form molecularly oriented structures. However, these polycarbonates are characterized by their rapid rate of crystallization. As a result they cannot be quenched by ordinary means with sufficient speed to halt their inherently rapid rate of crystallization.

In order for a linear polymer to be readily fabricated into a film which can be molecularly oriented in the plane of the film or fabricated into a fiber which can be oriented along its axis, it is necessary that the rate of crystallization of the extruded material be such that the material can be extruded and quenched to yield an amorphous fiber or film. Such amorphous products can then be mechanically and thermally treated to yield molecularly oriented products. The quenching should ordinarily be capable of being accomplished in air, or in a liquid such as water or an organic liquid which is not a solvent for the polymer. If the polymeric material is not properly quenched to form an amorphous material, then the polymeric material acquires a crystalline brittle character and cannot be satisfactorily worked mechanically due to the tendency toward breaking.

We have now found that certain interpolycarbonates can be prepared which possess a rate of crystallization such that an extruded film or fiber can be readily quenched by ordinary commercial means to create a substantially amorphous molecular structure within the material. For example, an extruded film having a thickness of the order of about 0.05 inch can be prepared from the interpolyesters of this invention and can be quenched in water to create a substantially amorphous product.

The novel interpolycarbonates of this invention can be prepared by a process which comprises (A) co-condensing a mixture consisting of at least 5 mole percent of a primary bis-(carbonate) monomer having the following formula:

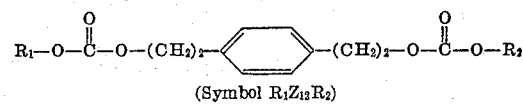

(Symbol $R_1Z_{12}R_2$)

wherein $R_1$ and $R_2$ each represents a radical selected from the group consisting of lower alkyl radicals containing from 1 to 4 carbon atoms and aryl radicals of the benzene series containing from 6 to 8 carbon atoms, together with at least 5 mole percent of a copolymerizable bis-(carbonate) monomer having one of the following formulas and which is employed in no greater proportion than the mole percentage indicated:

| Chemical Formula | Max., Percent | Symbol |
|---|---|---|
| $R_1O\!-\!CO\!-\!O\!-\!R_3\!-\!O\!-\!CO\!-\!OR_2$ | 50 | None. |
| $R_1O\!-\!CO\!-\!O\!-\!(CH_2)_2\!-\!O\!-\!\langle\!\!\!\bigcirc\!\!\!\rangle\!-\!O\!-\!(CH_2)_2\!-\!O\!-\!CO\!-\!OR_2$ | 50 | $R_1Z_{102}R_2$. |
| $R_1O\!-\!CO\!-\!O\!-\!(CH_2)_2\!-\!O\!-\!\langle\!\!\!\bigcirc\!\!\!\rangle\!-\!SO_2\!-\!\langle\!\!\!\bigcirc\!\!\!\rangle\!-\!O\!-\!(CH_2)_2\!-\!O\!-\!CO\!-\!OR_2$ | 20 | $R_1Z_{8-202}R_2$. |
| $R_1O\!-\!CO\!-\!O\!-\!CH_2\!-\!\langle\!\!\!\bigcirc\!\!\!\rangle\!-\!CH_2\!-\!O\!-\!CO\!-\!OR_2$ | 95 | $R_1Z_{11}R_2$. |
| $R_1O\!-\!CO\!-\!O\!-\!CH_2\!-\!\langle\!\!\!\bigcirc\!\!\!\rangle\!-\!\langle\!\!\!\bigcirc\!\!\!\rangle\!-\!CH_2\!-\!O\!-\!CO\!-\!OR_2$ | 95 | $R_1Z_{21}R_2$. |
| $R_1O\!-\!CO\!-\!O\!-\!(CH_2)_2\!-\!\langle\!\!\!\bigcirc\!\!\!\rangle\!-\!\langle\!\!\!\bigcirc\!\!\!\rangle\!-\!(CH_2)_2\!-\!O\!-\!CO\!-\!OR_2$ | 95 | $R_1Z_{22}R_2$. |
| $R_1O\!-\!CO\!-\!O\!-\!(CH_2)_2\!-\!O\!-\!\langle\!\!\!\bigcirc\!\!\!\rangle\!-\!\langle\!\!\!\bigcirc\!\!\!\rangle\!-\!O\!-\!(CH_2)_2\!-\!O\!-\!CO\!-\!OR_2$ | 95 | $R_1Z_{202}R_2$. | wherein $R_1$ and $R_2$ each represents a radical selected from the group consisting of lower alkyl radicals containing from 1 to 4 carbon atoms and aryl radicals of the benzene series containing from 6 to 8 carbon atoms and $R_3$ represents an alkylene radical containing from 4 to 10 carbon atoms, (B) in the presence of an ester-interchange catalyst containing titanium as the metallic element, which catalyst can be selected from the group consisting of $Ti(OR')_4$, and ether complexes of $TiX_4$ wherein the ether complexes are derived by reacting $TiX_4$ with an ether selected from the group consisting of aliphatic and alicyclic ethers containing from 2 to 12 carbon atoms, and wherein R' represents an alkyl radical containing from 1 to 18 carbon atoms and X represents a halogen atom, (C) at an elevated temperature, (D) the condensation being conducted in an inert atmosphere and (E) the latter part of the condensation being conducted at a very low pressure.

The symbols presented above are set forth in order to provide a convenient way in which to refer to the various copolymerizable bis-(carbonate) monomers without having to set forth the entire formula or chemical name on each occasion. No symbols are used for the aliphatic bis-(carbonates) since the names of these compounds are not especially complex. The symbol $Z_{21}$ represents a symmetrical bis-(carbonate) as indicated above wherein there are two (the first number in the subscript) benzene rings which are directly connected to one (the second number in the subscript) methylene radical. The symbol $Z_{102}$ has a similar connotation wherein there is one benzene ring connected at the 1 and 4 positions through a 0 atom to two methylene radicals. Symbol $Z_{S-202}$ connotes a sulfonyl radical at the 4 and 4' positions between 2 benzene rings which are connected at the 4 and 4' positions through a 0 atom to two methylene radicals, i. e. an ethylene radical. The other symbols have analogous connotations.

The $R_1$ and $R_2$ portions of these symbols further represents the nature of the ester. Thus, 1,4-bis-($\beta$-hydroxyethyl)-benzene-bis(n-propylcarbonate) has the symbol n-$C_3H_7Z_{12}$. The significance of $R_1$ is not repeated twice if $R_2$ is the same as $R_1$ as is usually the case.

It can be readily seen from the description of the process that there is no problem involved in adjusting the ratio of carbonate constituent to dihydroxy (glycol) constituent in the reaction vessel since the polycarbonates are produced according to this invention by the co-condensation of only one type of starting material. This establishes the composition of the polycarbonate produced since there can be no variation in the proportion of carbonate and gylcol constituents. Moreover, the nature of this process makes it admirably suited to conducting the process on a continuous basis since no problems are involved in maintaining critical proportions of reactants.

Examples of the primary class of starting materials, i. e. the primary bis-(carbonate) monomers which can be used in the process of this invention include 1,4-bis-($\beta$-hydroxyethyl)benzene-bis-(ethyl carbonate), i. e. $C_2H_5Z_{12}$ 1,4-bis-($\beta$-hydrovyethyl) benzene-bis-(p-tolyl carbonate) i. e. p-$CH_3C_6H_5Z_{12}$ 1,4-bis-($\beta$-hydroxyethyl)-benzene-bis-(phenyl carbonate), i. e. $C_6H_5Z_{12}$, 1,4-bis-($\beta$-hydroxyethyl)-benzene-bis-(n-butyl carbonate), i. e. n-$C_4H_9Z_{12}$, 1,4-bis-($\beta$-hydroxyethyl)-benzene-bis-(isopropyl carbonate), i. e. i-$C_3H_5Z_{12}$, 1,4-bis-($\beta$-hydroxyethyl)-benzene-bis-(methyl carbonate), i. e. $CH_3Z_{12}$, etc.

Examples of the copolymerizable bis-(carbonate) monomers which can be used in the process of this invention include:

| Chemical Formula | Symbol |
|---|---|
| $C_2H_5O-CO-O-(CH_2)_7-O-CO-OC_2H_5$ | none. |
| $C_2H_5O-CO-O-CH_2-\langle\rangle-CH_2-O-CO-OC_3H_7$ | $C_2H_5Z_{11}C_3H_7$. |
| $CH_3-\langle\rangle-O-CO-O-CH_2-\langle\rangle-CH_2-O-CO-O-\langle\rangle-CH_3$ | p-$CH_3C_6H_4Z_{11}$. |
| $C_3H_7O-CO-O-CH_2-\langle\rangle-CH_2-O-CO-OC_3H_7$ | n$C_3H_7Z_{11}$. |
| $CH_3O-CO-O-CH_2-\langle\rangle-\langle\rangle-CH_2-O-CO-OCH_3$ | $CH_3Z_{21}$. |
| $C_4H_9O-CO-O-(CH_2)_2-\langle\rangle-\langle\rangle-(CH_2)_2-O-CO-OC_4H_9$ | $C_4H_9Z_{22}$. |
| $CH_3O-CO-O-(CH_2)_2-O-\langle\rangle-O-(CH_2)_2-O-CO-OCH_3$ | $CH_3Z_{102}$. |
| $C_2H_5O-CO-O-(CH_2)_2-O-\langle\rangle-O-(CH_2)_2-O-CO-OC_2H_5$ | $C_2H_5Z_{102}$. |
| $CH_3O-CO-O-(CH_2)_2-O-\langle\rangle-\langle\rangle-O-(CH_2)_2-O-CO-OCH_3$ | $CH_3Z_{202}$. |
| $\langle\rangle-O-CO-O-(CH_2)_2-O-\langle\rangle-SO_2-\langle\rangle-O-(CH_2)_2-O-CO-O-\langle\rangle$ | $C_6H_5Z_{S-202}$. | et cetera.

It is to be noted that interpolycarbonates prepared from mixtures of alkyl and aryl $Z_{22}$ plus alkyl and aryl $Z_{11}$, $Z_{102}$, $Z_{202}$, $Z_{S-202}$ and aliphatic bis-(carbonates) are set forth in a copending application, Serial No. 407,804 filed on even date herewith by Delbert D. Reynolds and Kenneth R. Dunham.

In carrying out the process of this invention, the ester-interchange catalysts which can be employed as condensing agents are extremely limited as indicated. It would perhaps appear that any of the well-recognized ester-interchange catalysts would be operative. However, this has not been found to be the case. Very unexpectedly, the applicants discovered that only certain compounds of titanium can be satisfactorily employed as catalysts to produce the polyesters of this invention. Other compounds, even including some compounds of titanium, which are well-recognized ester-interchange catalysts promote the degradation of the starting material with the formation of ethylenic unsaturation and cross-linking. This aspect of the invention is discussed in greater detail hereinbelow.

The titanium catalysts described above can be advantageously employed in an amount of from about 0.005% to about 0.2% by weight based on the weight of the bis-(carbonate) monomers being condensed. Higher or lower percentages can also be employed.

The temperature at which the condensation is conducted depends upon whether the process is conducted in the solid phase or in the liquid phase. When either type of process is used, the temperature can be advantageously increased during the course of the condensation. Advantageously, the reaction can be considered as being conducted in two stages. The temperature to which the condensation reaction mixture is initially raised at the beginning of stage I is advantageously in excess of 200° C. Lower temperatures can also be employed although it is generally advantageous to use an initial temperature of at least about 200° C. Although it is convenient to consider the condensation process as being conducted in two separate stages, the actual condensation itself continues smoothly from stage I into stage II. The principal distinction between the so-called two stages lies in the fact that during stage II, the pressure of the adjacent atmosphere under which the condensation is performed is greatly reduced. Although the temperature can remain the same for both the first and the second stage, it is advantageous to employ a somewhat higher temperature at about the same time the pressure is reduced, especially when the liquid phase process is being employed. The temperatures used during the latter part of stage II can advantageously be at least 250° or higher; the maximum temperature which can be employed is determined by the tendency of the interpolycarbonate to decompose at extremely high temperatures. As a practical matter, it is most advantageous to employ a maximum temperature of not much more than about 250° C. When a solid phase process is employed the maximum temperature can be restricted to much lower temperatures, although the time required to accomplish the production of desirable linear polymeric polycarbonates may be increased accordingly.

The reduced pressure which is employed during stage II of the condensation is advantageously less than about 15 mm. of Hg of pressure or less. Generally speaking, pressures are employed which are the lowest pressures obtainable by the employment of an efficient high-vacuum mechanical pump. Such pressures are generally in the range of less than 1 mm. of Hg pressure.

The time required for each of the two stages can advantageously be from about one half to 4 to 5 hours. Longer or shorter periods of time can also be employed.

The inert atmospheres which can be advantageously employed in the course of the condensation reaction include atmospheres of nitrogen, hydrogen, helium, carbon dioxide, etc.

It is generally advantageous to stir the condensation reaction mixture in order to maintain a reasonably even distribution of heat throughout the reaction mixture and to otherwise facilitate the condensation. However, this is not essential especially when small quantities of mixed bis-(carbonate) monomers are being condensed. During the course of the reaction, an alkyl ester and/or an aryl ester of carbonic acid will be evolved as a gas, as indicated hereinabove. Stirring facilitates the removal of such an ester in its gaseous form. Either as an aid to the stirring operation or in lieu thereof, the inert gas can be advantageously bubbled through the reaction mixture whereby the removal of the carbonic acid ester is also facilitated.

The various conditions described somewhat generally hereinabove in regard to the process of this invention can obviously be altered to suit the particular starting material being condensed and other conditions which are specific to the reaction being accomplished depending upon the particular set of circumstances. These variations are set forth to some extent in the examples below.

The products of this invention are linear highly polymeric crystalline interpolycarbonates having melting points above about 100° C., high intrinsic viscosities and always containing at least 5 mole percent of the following repeating units:

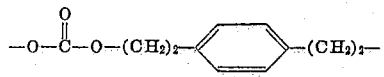

wherein the units are connected by ester linkages either to an identical unit or to a copolymerizable unit having one of the following formulas:

|  | Max., Percent |
|---|---|
| $-O-\overset{O}{\underset{\|}{C}}-O-R_3-$ | 50 |
| $-O-\overset{O}{\underset{\|}{C}}-O-(CH_2)_2-O-\langle\rangle-O-(CH_2)_2-$ | 50 |
| $-O-\overset{O}{\underset{\|}{C}}-O-(CH_2)_2-O-\langle\rangle-SO_2-\langle\rangle-O-(CH_2)_2-$ | 20 |
| $-O-\overset{O}{\underset{\|}{C}}-O-CH_2-\langle\rangle-CH_2-$ | 95 |
| $-O-\overset{O}{\underset{\|}{C}}-O-CH_2-\langle\rangle-\langle\rangle-CH_2-$ | 95 |
| $-O-\overset{O}{\underset{\|}{C}}-O-(CH_2)_2-\langle\rangle-\langle\rangle-(CH_2)_2-$ | 95 |
| $-O-\overset{O}{\underset{\|}{C}}-O-(CH_2)_2-O-\langle\rangle-\langle\rangle-O-(CH_2)_2-$ | 95 | wherein $R_3$ represents an alkylene radical containing from 4 to 10 carbon atoms, and the maximum mole percent is specified for the proportion of the copolymerizable unit in the interpolycarbonate.

In this specification all intrinsic viscosities are measured by standard procedures employing solutions in 60% phenol–40% sym. tetrachlorethane. The melting points of the interpolycarbonates described in the examples hereinbelow were all at least 110° C. and higher, except for some examples not covered by the claims.

The interpolycarbonates of this invention can be prepared by various continuous processes employing many types of apparatus known to be useful in conducting various related continuous processes as described in the prior art, for example, the method described in U. S. 2,647,885 can be suitably adapted. For another example reference is made to application, Serial No. 397,040 filed on December 8, 1953.

The primary bis-(carbonate) monomers employed in accordance with this invention can be prepared by condensing an alkyl or an aryl chlorocarbonate with 1,4-bis-($\beta$-hydroxyethyl)-benzene in the presence of pyridine. Although it is advantageous to carry out this condensation in a tertiary amine such as pyridine, other acid-binding agents can also be employed. This process is described in our copending application, Serial No. 397,037 filed on December 8, 1953. The preparation of the copolymerizable bis-(carbonate) monomers is analogous to this process and is described in other related applications filed on December 8, 1953.

The primary bis-(carbonate) monomer and various copolymerizable bis-(carbonate) monomers yield interpolycarbonates having an unstable structure when condensed in the presence of most ester-interchange catalysts whereby they decompose forming various undesirable products. This circumstance demonstrates the unusual advantages of employing the titanium catalysts covered by the applicants' invention. Several of the following examples illustrate the employment of titanium butoxide as the catalyst.

Titanium butoxide and many of its homologs are thick liquids. One drop weighs about 0.015 gram and contains about 0.0002 equivalents of titanium. It is sometimes advantageous to dissolve this compound or some of the other titanium compounds (alkoxides) in an alcohol to facilitate handling the catalyst.

Another titanium compound which has been found to be useful is titanium tetrachloride. Titanium tetrachloride is difficult to handle because of its rapid reaction with the moisture in the air. It has, therefore, been found advantageous to employ this compound in the form of an ether complex. In preparing these complexes, the lower aliphatic ethers containing from 2 to 8 carbon atoms on either side of the central oxygen atom and the cyclic ethers such as 1,4 dioxane can be employed. The ether complexes are prepared advantageously by adding titanium tetrachloride slowly to an excess of the ether. It is advantageous to maintain the ether at ambient temperatures (20°–30° C.) or lower during this addition. Examples regarding the preparation of these ether complexes are presented in our copending application, Serial No. 397,037, filed on December 8, 1953.

It is believed that the examples set forth in our copending application, Serial No. 397,037, make it quite clearly apparent that the specified titanium catalysts are essential to the preparation of linear highly polymeric crystalline polycarbonates when self-condensing the primary bis-(carbonate) monomers; the same can obviously be said of the mixed bis-(carbonate) monomer starting materials of this invention. Other catalysts such as the alkali metal and the alkaline earth metal alkoxides are either inoperative or are strikingly inferior to these titanium compounds as catalysts.

The interpolycarbonates of our invention can be further illustrated by the various working examples set forth below in somewhat tabular style. The reactants are set forth by name and by symbol (title of each example) in order to facilitate a comprehension of the interpolycarbonate being produced. The mole percentages are also indicated.

In each working example the primary bis-(carbonate) monomer and the copolymerizable bis-(carbonate) monomer were mixed together and the indicated catalyst was added in the specified amount. The reactants were heated and nitrogen or other specified inert gas was bubbled through the melt during stage I. The temperature is set forth in each example and was generally the same for both stage I and stage II unless otherwise indicated. The time for each stage is also set forth. The alkyl or aryl carbonate which formed during the course of stage I was allowed to escape or was collected by means of a condenser in working examples where fairly large quantities of reactants were involved. Stage I was generally considered as reaching an end when the condensation had proceeded to a point where further heating under a vacuum would not be capable of removing an appreciable amount of either of the bis-(carbonate) monomers being condensed. Stage II was then begun by attaching a vacuum pump to the reaction vessel and closing off the inlet for the inert gas. The reduced pressure employed was from 0.1 to 1 mm. of Hg pressure. This reduced pressure was maintained for the remainder of stage II. During stage II the alkyl or aryl carbonate which formed was condensed in at least one Dry Ice-acetone trap which was placed between the reaction vessel and the vacuum pump.

Catalysts employed in the working examples included titanium butoxide as such and also included a solution of titanium butoxide prepared by dissolving 2 cc. of titanium butoxide in 18 cc. of n-butyl alcohol. Another advantageous catalyst solution was made by dissolving 2 cc. of Ti ethoxide in 18 cc. of ethyl alcohol.

*Example 1.—95% ethyl $Z_{12}$ plus 5% 1,4-butanediol-bis-(ethyl carbonate)*

Reactants:
    1,4 - bis($\beta$-hydroxyethyl)benzene - bis(ethyl carbonate) (15 g. or 95 mol percent)
    1,4-butanediol-bis(ethyl carbonate) (0.6 g. or 5 mol percent)

Catalyst: 0.3 cc. Ti butoxide solution (see above)
Time:
    I Stage, 40 minutes, 250° C.
    II Stage, 2 hours, 250° C.
Remarks:
    (1) Clear, colorless melt
    (2) Crystallized to a white porcelain-like polymer
    (3) Insoluble in a mixture of 60:40 phenol: tetrachloroethane at 120° for two hours.
    (4) Melting point, 209° C.

*Example 2.—90% ethyl $Z_{12}$ plus 10% of 1,4-butanediol-bis-(ethyl carbonate)*

Reactants:
    1,4 - bis($\beta$-hydroxyethyl)benzene - bis(ethyl carbonate) (15.0 g. or 90 mol percent)
    1,4-butanediol-bis(ethyl carbonate) (1.3 g. or 10 mol percent)

Catalyst: 0.3 cc. Ti butoxide solution
Time:
    I Stage, 25 minutes, 250° C.
    II Stage, 2 hours, 250° C.
Remarks:
    (1) Clear, colorless melt
    (2) Crystallized to white, hard, porcelain-like mass
    (3) Insoluble in 60:40 phenol:tetrachloroethane after 2 hours at 110° C.
    (4) Melting point, 198° C.

*Example 3.—80% ethyl $Z_{12}$ plus 20% 1,4-butanediol-bis-(ethyl carbonate)*

Reactants:
    1,4 - bis($\beta$-hydroxyethyl)benzene - bis(ethyl carbonate) (12.4 g. or 80 mol percent)
    1,4-butanediol-bis(ethyl carbonate) (2.4 g. or 20 mol percent)

Catalyst: 0.3 cc. Ti butoxide solution
Time:
    I Stage, 25 minutes, 250° C.
    II Stage, 2 hours, 250° C.

Remarks:
(1) Soluble in 60:40 phenol:tetrachloroethane
(2) Intrinsic viscosity is 0.46.
(3) Crystallized to white porcelain-like mass
(4) Clear, colorless melt
(5) Crystallized more slowly than Examples 1 and 2
(6) Melting point 191° C.

*Example 4.—50% ethyl $Z_{12}$ plus 50% 1,4-butanediol-bis-(ethyl carbonate)*

Reactants:
1,4 - bis($\beta$-hydroxyethyl)benzene - bis(ethyl carbonate) (10.4 g. or 50 mol percent)
1,4-butanediol-bis(ethyl carbonate) (7.8 g. or 50 mol percent)
Catalyst: 0.3 cc. Ti butoxide solution
Time:
  I Stage, 35 minutes, 250° C.
  II Stage, 2 hours, 250° C.
Remarks:
(1) Soluble in 60:40 phenol:tetrachloroethane
(2) Intrinsic viscosity, 0.45
(3) Crystallized to a white, tough, flexible polymer having a waxy appearance
(4) Melting point 143° C.

*Example 5.—25% ethyl $Z_{12}$ plus 75% 1,4-butanediol-bis-(ethyl carbonate)*

Reactants:
1,4 - bis($\beta$-hydroxyethyl)benzene - bis(ethyl carbonate) (3.9 g. or 25 mol percent)
1,4-butanediol-bis(ethyl carbonate) (8.8 g. or 75 mol percent)
Catalyst: 0.3 cc. Ti butoxide solution
Time:
  I Stage, 50 minutes, 250° C.
  II Stage, 2 hours, 250° C.
Remarks:
(1) Soluble in 60:40 phenol:tetrachloroethane
(2) Intrinsic viscosity 0.53
(3) Crystallized to a white, tough, flexible polymer having a waxy appearance somewhat similar in appearance to the product in Example 4.
(4) Melting point 92° C.

*Example 6.—5% ethyl $Z_{12}$ plus 95% 1,4-butanediol-bis-(ethyl carbonate)*

Reactants:
1,4 - bis($\beta$-hydroxyethyl)benzene - bis(ethyl carbonate) (0.78 g. or 5 mol percent)
1,4-butanediol-bis(ethyl carbonate) (11.1 g. or 95 mol percent)
Catalyst: 0.3 cc. Ti butoxide solution
Time:
  I Stage, 50 minutes, 250° C.
  II Stage, 2 hours, 250° C.
Remarks:
(1) Soluble in 60:40 phenol:tetrachloroethane
(2) Intrinsic viscosity 0.47
(3) Upon cooling it was a clear, colorless gum which gradually crystallized to a white wax, very similar to paraffin in appearance.
(4) Melting point, 47° C.

*Example 7.—90% ethyl $Z_{12}$ plus 10% 1,5-pentanediol-bis-(ethyl carbonate)*

Reactants:
1,4 - bis($\beta$-hydroxyethyl)benzene - bis(ethyl carbonate) (60 g. or 90 mol percent)
1,5-pentanediol-bis(ethyl carbonate) (5.6 g. or 10 mol percent)
Catalyst: 3 drops of Ti butoxide (undissolved)
Time:
  I Stage, 30 minutes, 250° C.
  II Stage, 2 hours (with stirring), 250° C.

Remarks:
(1) Soluble in 60:40 phenol:tetrachloroethane
(2) Intrinsic viscosity 0.51
(3) Crystallized to a white, porcelain-like mass
(4) Clear, colorless melt from which fibers can be drawn
(5) Fibers could be cold drawn to give strong fibers
(6) Melting point, 205° C.

*Example 8.—90% ethyl $Z_{12}$ plus 10% 1,5-pentanediol-bis-(ethyl carbonate)*

The procedure described in Example 7 was repeated exactly except that the temperature employed was 260° C. The product cooled to form a white, hard, porcelain-like mass.

*Example 9.—90% ethyl $Z_{12}$ plus 10% 1,5-pentanediol-bis-(ethyl carbonate)*

The procedure described in Example 7 was repeated exactly except that the temperature employed was 260° C. and the catalyst employed was 4 drops of titanium ethoxide instead of the butoxide. The product was essentially the same as in Example 8.

*Example 10.—90% ethyl $Z_{12}$ plus 10% 1,5-pentanediol-bis-(ethyl carbonate)*

The procedure described in Example 7 was repeated exactly except that the reactants and catalyst were employed in 100 times the quantities specified and the following conditions were different:
Time:
  I Stage, 40 minutes, 240° C.
  II Stage, 2.5 hours (with stirring), 260° C.

The product was essentially the same as in Example 7 although it possessed a higher intrinsic viscosity. The melt was extruded as a film having a thickness of 0.05 inch which became satisfactorily quenched in air to form an amorphous product. This film was then drawn in two directions perpendicular to each other along the plane of the film so as to form a molecularly oriented structure which was heat set to produce a sheet or film having excellent properties for use as a wrapping material, photographic emulsion support, electrical insulator, etc.

*Example 11.—80% ethyl $Z_{12}$ plus 20% 1,5-pentanediol-bis-(ethyl carbonate)*

Reactants:
1,4-bis($\beta$-hydroxyethyl)benzene-bis(ethyl carbonate) (50 g. or 80 mol percent)
1,5-pentanediol-bis(ethyl carbonate) (10 g. or 20 mol percent)
Catalyst: 3 drops Ti butoxide (undissolved)
Time:
  I Stage, 50 minutes, 250° C.
  II Stage, 2.5 hours (with stirring), 250° C.
Remarks:
(1) Soluble in 60:40 phenol:tetrachloroethane
(2) Intrinsic viscosity 0.67
(3) Smooth, clear, colorless melt
(4) Gave fibers which could be cold drawn to strong fibers—more elastic than fibers from Example 7
(5) Mass crystallized to a white, porcelain-like product
(6) Melting point, 197° C.

*Example 12.—50% ethyl $Z_{12}$ plus 50% 1,5-pentanediol-bis-(ethyl carbonate)*

Reactants:
1,4-bis($\beta$-hydroxyethyl)benzene-bis(ethyl carbonate) (7.8 g. or 50 mol percent)
1,5-pentanediol-bis(ethyl carbonate) (6.2 g. or 50 mol percent)
Catalyst: 0.3 cc. Ti butoxide solution Time:
  I Stage, 30 minutes, 250° C.
  II Stage, 2.75 hours, 250° C.
Remarks:
  (1) Soluble in 60:40 phenol:tetrachloroethane
  (2) Intrinsic viscosity 0.50
  (3) Crystallized to a white, tough polymer with waxy appearance
  (4) Gave a clear, colorless melt
  (5) Melting point, 125° C.

*Example 13.—5% ethyl $Z_{12}$ plus 95% 1,5-pentanediol-bis-(ethyl carbonate)*

Reactants:
  1,4-bis($\beta$-hydroxyethyl)benzene-bis(ethyl carbonate) (0.78 g. or 5 mol percent)
  1,5-pentanediol-bis(ethyl carbonate) (11.4 g. or 95 mol percent)
Catalyst: 0.3 cc. Ti butoxide solution
Time:
  I Stage, 30 minutes, 250° C.
  II Stage, 2.75 hours, 250° C.
Remarks:
  (1) Soluble in 60:40 phenol:tetrachloroethane
  (2) Intrinsic viscosity, 0.42
  (3) Product was a clear, colorless soft gum when cooled, and it gradually crystallized upon standing
  (4) Melting point, 40° C.

*Example 14.—95% ethyl $Z_{12}$ plus 5% 1,6-hexanediol-bis-(ethyl carbonate)*

Reactants:
  1,4-bis($\beta$-hydroxyethyl)benzene-bis(ethyl carbonate) (10 g. or 95 mol percent)
  1,6-hexanediol-bis(ethyl carbonate) (0.45 g. or 5 mol percent)
Catalyst: 0.2 cc. Ti butoxide solution
Time:
  I Stage, 45 minutes, 250° C.
  II Stage, 2 hours, 250° C.
Remarks:
  (1) Insoluble in 60:40 phenol:tetrachloroethane after 2 hours at 120° C.
  (2) Gave clear, colorless melt which crystallized to white porcelain-like polymer
  (3) Fiber drawn from melt crystallized readily in air
  (4) Melting point, 208° C.

*Example 15.—90% ethyl $Z_{12}$ plus 10%, 1,6-hexanediol-bis-(ethyl carbonate)*

Reactants:
  1,4-bis($\beta$-hydroxyethyl)benzene-bis(ethyl carbonate) (60 g. or 90 mol percent)
  1,6-hexanediol-bis(ethyl carbonate) (5.6 g. or 10 mol percent)
Catalyst: 4 drops Ti butoxide (undissolved)
Time:
  I Stage, 1 hours, 250° C.
  II Stage, 2.5 hours (stirring), 250° C.
Remarks:
  (1) Soluble in 60:40 phenol:tetrachloroethane
  (2) Intrinsic viscosity, 0.56
  (3) Clear, colorless melt
  (4) Crystallized to white porcelain-like mass
  (5) Threads could be cold drawn to give strong fibers having good elasticity
  (6) Melting point, 207° C.

*Example 16.—80% ethyl $Z_{12}$ plus 20% 1,6-hexanediol-bis-(ethyl carbonate)*

Reactants:
  1,4-bis($\beta$-hydroxyethyl)benzene-bis(ethyl carbonate) (50 g. or 80 mol percent)
  1,6-hexanediol-bis(ethyl carbonate) (10.5 g. or 20 mol percent)
Catalyst: 4 drops Ti butoxide (undissolved)
Time:
  I Stage, 1 hours, 250° C.
  II Stage, 2.5 hours (with stirring), 250° C.
Remarks:
  (1) Soluble in 60:40 phenol:tetrachloroethane
  (2) Clear, colorless melt which crystallized to a white porcelain-like material
  (3) Fibers could be cold drawn to give tough threads

*Example 17.—50% ethyl $Z_{12}$ plus 50% 1,6-hexanediol-bis-(ethyl carbonate)*

Reactants:
  1,4-bis($\beta$-hydroxyethyl)benzene-bis(ethyl carbonate) (8 g. or 50 mol percent)
  1,6-hexanediol-bis(ethyl carbonate) (6.8 g. or 50 mol percent)
Catalyst: 0.2 cc. Ti butoxide solution
Time:
  I Stage, 40 minutes, 250° C.
  II Stage, 2 hours, 250° C.
Remarks:
  (1) Soluble in 60:40 phenol:tetrachloroethane
  (2) Intrinsic viscosity 0.36
  (3) Clear, colorless melt crystallized to a white, tough polymer with a waxy appearance
  (4) Melting point, 138° C.

*Example 18.—25% ethyl $Z_{12}$ plus 75% 1,6-hexanediol-bis-(ethyl carbonate)*

Reactants:
  1,4-bis($\beta$-hydroxyethyl)benzene-bis(ethyl carbonate) (3.9 g. or 25 mol percent)
  1,6-hexanediol-bis(ethyl carbonate) (9.8 g. or 75 mol percent)
Catalyst: 0.3 cc. Ti butoxide solution
Time:
  I Stage, 30 minutes, 250° C.
  II Stage, 2.75 hours, 250° C.
Remarks:
  (1) Soluble in 60:40 phenol:tetrachloroethane
  (2) Intrinsic viscosity 0.44
  (3) Clear, colorless melt which crystallized to give a white, tough wax
  (4) Melting point, 68° C.

*Example 19.—5% ethyl, $Z_{12}$ plus 95% 1,6-hexanediol-bis-(ethyl carbonate)*

Reactants:
  1,4-bis($\beta$-hydroxyethyl)benzene-bis(ethyl carbonate) (0.78 g. or 5 mol percent)
  1,6-hexanediol-bis(ethyl carbonate) (12.5 g. or 95 mol percent)
Catalyst: 0.3 cc. Ti butoxide solution
Time:
  I Stage, 30 minutes, 250° C.
  II Stage, 2.75 hours, 250° C.
Remarks:
  (1) Soluble in 60:40 phenol:tetrachloroethane
  (2) Intrinsic viscosity 0.42
  (3) Clear, colorless melt which crystallized to a tough, white waxy polymer
  (4) Melting point, 49° C.

*Example 20.—95% ethyl $Z_{12}$ plus 5% 1,10-decanediol-bis(ethyl carbonate)*

Reactants:
  1,4-bis($\beta$-hydroxyethyl)benzene-bis(ethyl carbonate) (9.8 g. or 95 mol percent)
  1,10-decanediol-bis(ethyl carbonate) (0.55 g. or 5 mol percent)
Catalyst: 0.3 cc. Ti butoxide solution
Time:
  I Stage, 30 minutes, 250° C.
  II Stage, 2 hours, 250° C.

Remarks:
(1) Clear, colorless melt. Crystallizes rapidly to a white mass
(2) Insoluble in 60:40 phenol:tetrachloroethane after 1.5 hours at 145° C.
(3) Melting point, 213° C.

*Example 21.—90% ethyl $Z_{12}$ plus 10% 1,10-decanediol-bis-(ethyl carbonate)*

Reactants:
    1,4-bis($\beta$-hydroxyethyl)benzene-bis(ethyl carbonate) (9.3 g. or 90 mole percent)
    1,10-decanediol-bis(ethyl carbonate) (1.1 g. or 10 mol percent)
Catalyst: 0.3 cc. Ti butoxide solution
Time:
    I Stage, 30 minutes, 250° C.
    II Stage, 2 hours, 250° C.
Remarks:
(1) Clear, colorless melt, which crystallizes rapidly to a white porcelain-like mass
(2) Soluble in 60:40 phenol:tetrachloroethane
(3) Intrinsic viscosity 0.58
(4) Melting point, 210° C.

*Example 22.—80% ethyl $Z_{12}$ plus 20% 1,10-decanediol-bis-(ethyl carbonate)*

Reactants:
    1,4-bis($\beta$-hydroxyethyl)benzene-bis(ethyl carbonate) (8.3 g. or 80 mol percent)
    1,10-decanediol-bis(ethyl carbonate) (2.2 g. or 20 mol percent)
Catalyst: 0.3 cc. Ti butoxide solution
Time:
    I Stage, 30 minutes, 250° C.
    II Stage, 2 hours, 250° C.
Remarks:
(1) Clear, colorless melt which crystallized less readily than those of Examples 20 and 21
(2) Fibers could be drawn more easily than those from Examples 20 and 21
(3) Cold drew nicely to give strong fibers
(4) Intrinsic viscosity 0.58
(5) Melting point 195° C.

*Example 23.—80% phenyl $Z_{12}$ plus 20% 1,10-decanediol-bis-(phenyl carbonate)*

Reactants:
    1,4-bis($\beta$-hydroxyethyl)-benzene-bis(phenyl carbonate) (9.8 g. or 80 mole percent)
    1,10-decanediol-bis-(phenyl carbonate) (2.6 g. or 20 mole percent)
Catalyst: 0.1 g. dimethyl ether complex of Ti tetrachloride (see above)
Time:
    I Stage, 40 minutes, 240° C.
    II Stage, 100 minutes, 260° C.
Remarks: (1) The product was essentially the same as in Example 22.

*Example 24.—80% n-butyl $Z_{12}$ plus 20% 1,10-decanediol-bis(n-butyl carbonate)*

The procedure described in Example 22 was repeated exactly except that equivalent quantities of the n-butyl homologs were condensed. The product was essentially the same.

*Example 25.—50% ethyl $Z_{12}$ plus 50% 1,10-decanediol-bis-(ethyl carbonate)*

Reactants:
    1,4-bis($\beta$-hydroxyethyl)benzene-bis(ethyl carbonate) (5.2 g. or 50 mol percent)
    1,10-decanediol-bis(ethyl carbonate) (5.5 g. or 50 mol percent)
Catalyst: 0.3 cc. Ti butoxide solution
Time:
    I Stage, 30 minutes, 250° C.
    II Stage, 2 hours, 2550° C.

Remarks:
(1) Clear, colorless melt. Crystallized to a white, flexible, tough polymer
(2) Threads cold drew nicely. Not as strong as threads from Example 19
(3) Intrinsic viscosity 0.50
(4) Melting point, 135° C.

*Example 26.—25% ethyl $Z_{12}$ plus 75% 1,10-decanediol-bis-(ethyl carbonate)*

Reactants:
    1,4-bis($\beta$-hydroxyethyl)benzene-bis(ethyl carbonate) (2.6 g. or 25 mol percent)
    1,10-decanediol-bis(ethyl carbonate) (8.2 g. or 75 mol percent)
Catalyst: 0.3 cc. Ti butoxide solution
Time:
    I Stage, 30 minutes, 250° C.
    II Stage, 2 hours, 250° C.
Remarks:
(1) Crystallized to a white, flexible polymer with a waxy appearance
(2) Clear, colorless melt
(3) Intrinsic viscosity 0.45
(4) Melting point, 71° C.

*Example 27.—5% ethyl $Z_{12}$ plus 95%, 1,10-decanediol-bis-(ethyl carbonate)*

Reactants:
    1,4-bis($\beta$-hydroxyethyl)benzene-bis(ethyl carbonate) (0.52 g. or 5 mol percent)
    1,10-decanediol-bis(ethyl carbonate) (10.3 g. or 95 mol percent)
Catalyst: 0.3 cc. Ti butoxide solution
Time:
    I Stage, 30 minutes, 250° C.
    II Stage, 2 hours, 250° C.
Remarks:
(1) Clear, colorless melt
(2) Crystallized to a white, brittle polymer with waxy properties
(3) Intrinsic viscosity, 0.55
(4) Melting point, 30° C.

*Example 28.—95% ethyl $Z_{12}$ plus 5% 2,5-hexanediol-bis-(ethyl carbonate)*

Reactants:
    1,4-bis($\beta$-hydroxyethyl)benzene-bis(ethyl carbonate) (10 g. or 95 mol percent)
    2,5-hexanediol-bis(ethyl carbonate) (0.45 g. or 5 mol percent)
Catalyst: 0.3 cc. Ti butoxide solution
Time:
    I Stage, 45 minutes, 250° C.
    II Stage, 1.5 hours, 250° C.
Remarks:
(1) Clear, colorless melt
(2) Crystallized rapidly to a white porcelain-like polymer

*Example 29.—90% ethyl $Z_{12}$ plus 10% 2,5-hexanediol-bis-(ethyl carbonate)*

Reactants:
    1,4-bis($\beta$-hydroxyethyl)benzene-bis(ethyl carbonate) (12 g. or 90 mol percent)
    2,5-hexanediol-bis(ethyl carbonate) (1.1 g. or 10 mol percent)
Catalyst: 0.3 cc. Ti butoxide solution
Time:
    I Stage, 45 minutes, 250° C.
    II Stage, 1.5 hours, 250° C.
Remarks: (1) Clear, colorless melt. Crystallized rapidly to white porcelain-like mass

*Example 30.—20% ethyl $Z_{12}$ plus 80% 2,5-hexanediol-bis-(ethyl carbonate)*

Reactants:
 1,4-bis($\beta$-hydroxyethyl)benzene-bis(ethyl carbonate) (10 g. or 80 mol percent)
 2,5-hexanediol-bis(ethyl carbonate) (2.1 g. or 20 mol percent)

Catalyst: 0.3 cc. Ti butoxide solution

Time:
 I Stage, 45 minutes, 250° C.
 II Stage, 1.5 hours, 250° C.

Remarks: (1) Clear, colorless, melt. Crystallized to white porcelain mass. Threads crystallized rapidly in air. Threads were somewhat brittle.

*Example 31.—50% ethyl $Z_{12}$ plus 50% 2,5-hexanediol-bis-(ethyl carbonate)*

Reactants:
 1,4-bis($\beta$-hydroxyethyl)benzene-bis(ethyl carbonate) (8 g. or 50 mol percent)
 2,5-hexanediol-bis(ethyl carbonate) (6.8 g. or 50 mol percent)

Catalyst: 0.3 cc. Ti butoxide solution

Time:
 I Stage, 45 minutes, 250° C.
 II Stage, 1.5 hours, 250° C.

Remarks:
(1) Clear, colorless mass. Crystallized to a somewhat brittle, white mass
(2) Apparently some of 2,5-hexanediol derivative was lost because yield was noticeably smaller.

*Example 32.—25% ethyl $Z_{12}$ plus 75% 2,5-hexanediol-bis-(ethyl carbonate)*

Reactants:
 1,4-bis($\beta$-hydroxyethyl)benzene-bis(ethyl carbonate) (3.9 g. or 25 mol percent)
 2,5-hexanediol-bis(ethyl carbonate) (9.8 g. or 75 mol percent)

Time:
 I Stage, 45 minutes, 250° C.
 II Stage, 1.5 hours, 250° C.

Remarks:
(1) Yield was low due to distillation of products from the 2,5-hexanediol derivative
(2) Residue crystallized to brittle, white polymer
(3) When the proportion of $Z_{12}$ was reduced to 5 mole percent most of starting material was lost by distillation of 2,5-hexanediol derivative breakdown products and the residue was non-crystalline gum.

*Example 33.—95% ethyl $Z_{12}$ plus 5% ethyl $Z_{102}$*

Reactants:
 1,4-bis($\beta$-hydroxyethyl)benzene-bis(ethyl carbonate) (15 g. or 95 mol percent)
 1,4-bis($\beta$-hydroxyethoxy)benzene-bis(ethyl carbonate) (0.87 g. or 5 mol percent)

Catalyst: 0.3 cc. Ti butoxide solution

Time:
 I Stage, 30 minutes, 250° C.
 II Stage, 2.25 hours, 250° C.

Remarks:
(1) Clear melt at 250° C.
(2) Crystallized to a white porcelain-like polymer
(3) Insoluble in 60:40 phenol:tetrachloroethane after 2 hours at 110° C.
(4) Melting point, 225° C.

*Example 34.—90% ethyl $Z_{12}$ plus 10% ethyl $Z_{102}$*

Reactants:
 1,4-bis($\beta$-hydroxyethyl)benzene-bis(ethyl carbonate) 15 g. or 90 mol percent)
 1,4-bis($\beta$-hydroxyethoxy)benzene-bis(ethyl carbonate) (1.8 g. or 10 mol percent)

Catalyst: 0.3 cc. Ti butoxide solution

Time:
 I Stage, 30 minutes, 250° C.
 II Stage, 2.25 hours, 250° C.

Remarks:
(1) Clear melt at 250° C.
(2) Crystallized to a white porcelain-like polymer
(3) Insoluble in 60:40 phenol:tetrachloroethane after 2 hours at 110° C.
(4) Melting point, 225° C.

*Example 35.—80% ethyl $Z_{12}$ plus 20% ethyl $Z_{102}$*

Reactants:
 1,4-bis($\beta$-hydroxyethyl)benzene-bis(ethyl carbonate) (12.4 g. or 80 mol percent)
 1,4-bis($\beta$-hydroxyethoxy)benzene-bis(ethyl carbonate) 3.4 g. or 20 mol percent)

Catalyst: 0.3 cc. Ti butoxide solution

Time:
 I Stage, 30 minutes, 250° C.
 II Stage, 3 hours, 250° C.

Remarks:
(1) Clear, colorless melt which crystallized to a white porcelain-like polymer
(2) Browned somewhat when the hot melt was exposed to air
(3) Insoluble in 60:40 phenol:tetrachloroethane after 2 hours at 110° C.

*Example 36.—50% ethyl $Z_{12}$ plus 50% ethyl $Z_{102}$*

Reactants:
 1,4-bis($\beta$-hydroxyethyl)benzene-bis(ethyl carbonate) (7.8 g. or 50 mol percent)
 1,4-bis($\beta$-hydroxyethoxy)benzene-bis(ethyl carbonate) (8.5 g. or 50 mol percent)

Catalyst: 0.3 cc. Ti butoxide solution

Time:
 I Stage, 30 minutes, 250° C.
 II Stage, 3 hours, 250° C.

Remarks:
(1) Soluble in 60:40 phenol:tetrachloroethane
(2) Intrinsic viscosity 0.77
(3) It did not crystallize upon cooling, but set to a clear, tough, colorless, flexible polymer.
(4) Melting point, 135° C.

*Example 37.—25% ethyl $Z_{12}$ plus 75% ethyl $Z_{102}$*

Reactants:
 1,4-bis($\beta$-hydroxyethyl)benzene-bis(ethyl carbonate) (3.6 g. or 25 mol percent)
 1,4-bis($\beta$-hydroxyethoxy)benzene-bis(ethyl carbonate) (12 g. or 75 mol percent)

Catalyst: 0.3 cc. Ti butoxide solution

Time:
 I Stage, 30 minutes, 250° C.
 II Stage, 2.75 hours, 250° C.

Remarks:
(1) Clear, colorless melt at 250° C.
(2) Cooled to a clear, tough, flexible polymer
(3) Soluble in 60:40 phenol:tetrachloroethane
(4) Intrinsic viscosity 0.38
(5) Melting point, 80° C.

*Example 38.—5% ethyl $Z_{12}$ plus 95% ethyl $Z_{102}$*

Reactants:
 1,4-bis($\beta$-hydroxyethyl)benzene-bis(ethyl carbonate) (0.72 g. or 5 mol percent)
 1,4-bis($\beta$-hydroxyethoxy)benzene-bis(ethyl carbonate) (15 g. or 95 mol percent)

Catalyst: 0.3 cc. Ti butoxide solution

Time:
 I Stage, 30 minutes, 250° C.
 II Stage, 2.75 hours, 250° C.

Remarks:
(1) Clear, colorless melt
(2) Cooled to a clear, tough, flexible polymer
(3) Soluble in 60:40 phenol:tetrachloroethane
(4) Intrinsic viscosity, 0.36

*Example 39.—95% ethyl $Z_{12}$ plus 5% ethyl $Z_{S-202}$*

Reactants:
1,4-bis(β-hydroxyethyl)benzene-bis(ethyl carbonate) (14.8 g. or 95 mol percent)
4,4'-bis(β-hydroxyethoxy)diphenyl sulfone-bis(ethyl carbonate) (1.2 g. or 5 mol percent)
Catalyst: 0.3 cc. Ti butoxide solution
Time:
I Stage, 45 minutes, 250° C.
II Stage, 1 hour, 250° C.
Remarks:
(1) Clear, smooth melt
(2) Crystallized readily to a white porcelain-like polymer
(3) Threads drawn from the melt crystallized rapidly in air. They were somewhat too brittle to be cold drawn easily.
(4) Soluble in 60:40 phenol:tetrachloroethane
(5) Intrinsic viscosity, 0.49
(6) Melting point, 205° C.

*Example 40.—90% ethyl $Z_{12}$ plus 10% ethyl $Z_{S-202}$*

Reactants:
1,4-bis(β-hydroxyethyl)benzene-bis(ethyl carbonate) (14.0 g. or 90 mol percent)
4,4'-bis(β-hydroxyethoxy)diphenyl sulfone-bis(ethyl carbonate) (2.4 g. or 10 mol percent)
Catalyst: 0.3 cc. Ti butoxide solution
Time:
I Stage, 45 minutes, 250° C.
II Stage, 1 hour, 250° C.
Remarks:
(1) Crystallized more slowly than the product from Example 39
(2) Threads drawn from melt were quenched sufficiently in air so that they could be cold drawn to yield strong fibers
(3) Soluble in 60:40 phenol:tetrachloroethane
(4) Intrinsic viscosity 0.30
(5) Polycarbonate reaction mass crystallized to a white porcelain-like product
(6) Melting point, 190° C.

*Example 41.—90% n-butyl $Z_{12}$ plus 10% n-butyl $Z_{S-202}$*

The procedure described in Example 40 was repeated exactly except that equivalent quantities of the n-butyl homologs of the starting materials were condensed instead of the ethyl esters of Example 40. The product obtained was essentially the same as in Example 40.

*Example 42.—90% ethyl $Z_{12}$ plus 10% ethyl $Z_{S-202}$*

The procedure described in Example 40 was repeated exactly except that the reactants and catalyst were employed in 100 times the quantity and the following conditions were different:
Time:
I Stage, 1 hour, 235° C.
II Stage, 80 minutes, 260° C.
The reaction was conducted with continuous stirring. The product was essentially the same as in Example 40 although it had a higher intrinsic viscosity. This melt was extruded as a film having a thickness of 0.05 inch which became satisfactorily quenched in water to form an amorphous product. This film was then drawn in perpendicular directions along the plane of the film so as to form a molecularly oriented structure which was heat set to produce a sheet or film having excellent properties suitable for use as wrapping material, photographic film, etc.

*Example 43.—80% ethyl $Z_{12}$ plus 20% ethyl $Z_{S-202}$*

Reactants:
1,4-bis(β-hydroxyethyl)benzene-bis(ethyl carbonate) (12.4 g. or 80 mol percent)
4,4'-bis(β-hydroxyethoxy)diphenyl sulfone-bis(ethyl carbonate) (4.8 g. or 20 mol percent)
Catalyst: 0.3 cc. Ti butoxide solution
Time:
I Stage, 45 minutes, 240° C.
II Stage, 1 hour, 260° C.
Remarks:
(1) Polymer crystallized very slowly.
(2) Soluble in 60:40 phenol:tetrachloroethane
(3) Intrinsic viscosity, 0.29
(4) Melting point 150° C.

*Example 44.—95% ethyl $Z_{12}$ plus 5% ethyl $Z_{11}$*

Reactants:
1,4-bis(β-hydroxyethyl)benzene-bis(ethyl carbonate) (15 g. or 95 mol percent)
1,4-bis(hydroxymethyl)benzene-bis(ethyl carbonate) (0.72 g. or 5 mol percent)
Catalyst: 0.3 cc. Ti butoxide solution
Time:
I Stage, 30 minutes, 250° C.
II Stage, 30 minutes, 250° C.
Remarks:
(1) Clear, colorless melt which crystallized to a white porcelain-like mass
(2) Insoluble in 60:40 phenol:tetrachloroethane after 2 hours at 110° C.
(3) Melting point 208° C.

*Example 45.—90% ethyl $Z_{12}$ plus 10% ethyl $Z_{11}$*

Reactants:
1,4-bis(β-hydroxyethyl)benzene-bis(ethyl carbonate) (15 g. or 90 mol percent)
1,4-bis(hydroxymethyl)benzene-bis(ethyl carbonate) (1.5 g. or 10 mol percent)
Catalyst: 0.3 cc. Ti butoxide solution
Time:
I Stage, 30 minutes, 250° C.
II Stage, 30 minutes, 250° C.
Remarks:
(1) Insoluble in 60:40 phenol:tetrachloroethane after 2 hours at 110° C.
(2) Smooth, clear, colorless melt which crystallized to a white porcelain-like mass
(3) Melting point 205° C.

*Example 46.—80% ethyl $Z_{12}$ plus 20% ethyl $Z_{11}$*

Reactants:
1,4-bis(β-hydroxyethyl)benzene-bis(ethyl carbonate) (15.0 g. or 80 mol percent)
1,4-bis(hydroxymethyl)benzene-bis(ethyl carbonate) (2.6 g. or 20 mol percent)
Catalyst: 0.3 cc. Ti butoxide solution
Time:
I Stage, 40 minutes, 250° C.
II Stage, 1.5 hours, 250° C.
Remarks:
(1) Insoluble in 60:40 phenol:tetrachloroethane after 2 hours at 110° C.
(2) Clear, colorless melt which crystallized to yield a white porcelain-like polymer
(3) Melting point 195° C.

*Example 47.—50% ethyl $Z_{12}$ plus 50% ethyl $Z_{11}$*

Reactants:
1,4-bis(β-hydroxyethyl)benzene-bis(ethyl carbonate) (7.8 g. or 50 mol percent)
1,4-bis(hydroxymethyl)benzene-bis(ethyl carbonate) (7.0 g. or 50 mol percent)
Catalyst: 0.3 cc. Ti butoxide solution
Time:
I Stage, 40 minutes, 250° C.
II Stage, 1 hour, 250° C.

Remarks:
(1) Crystallized with considerable difficulty
(2) Clear, colorless, tough, amorphous polymer when allowed to cool gradually
(3) Soluble in 60:40 phenol:tetrachloroethane
(4) Intrinsic viscosity 0.64
(5) Melting point 127° C.

*Example 48.—25% ethyl $Z_{12}$ plus 75% ethyl $Z_{11}$*

Reactants:
   1,4-bis($\beta$-hydroxyethyl)benzene-bis(ethyl carbonate) (3.9 g. or 25 mol percent)
   1,4-bis(hydroxymethyl)benzene-bis(ethyl carbonate) (10.6 g. or 75 mol percent)
Catalyst: 0.3 cc. Ti butoxide solution
Time:
   I Stage, 1 hour and 35 minutes, 250° C.
   II Stage, 1 hour and 30 minutes, 250° C.
Remarks:
(1) Soluble in 60:40 phenol:tetrachloroethane
(2) Intrinsic viscosity, 0.57
(3) Clear, colorless melt which crystallized when cooled to room temperature to a hard, translucent mass
(4) Melting point 165° C.

*Example 49.—5% ethyl $Z_{12}$ plus 95% ethyl $Z_{11}$*

Reactants:
   1,4-bis($\beta$-hydroxyethyl)benzene-bis(ethyl carbonate) (0.78 g. or 5 mol percent)
   1,4-bis(hydroxymethyl)benzene-bis(ethyl carbonate) (13.4 g. or 95 mol percent)
Catalyst: 0.3 cc. Ti butoxide solution
Time:
   I Stage, 1.5 hours, 250° C.
   II Stage, 1.5 hours, 250° C.
Remarks:
(1) Insoluble in 60:40 phenol:tetrachloromethane after 2 hours at 110° C.
(2) Clear, colorless melt which crystallized to yield a white porcelain-like polymer
(3) Melting point 207° C.

*Example 50.—95% ethyl $Z_{12}$ plus 5% ethyl $Z_{21}$*

Reactants:
   1,4-bis($\beta$-hydroxyethyl)benzene-bis(ethyl carbonate) (9.8 g. or 95 mol percent)
   0.6 g. 4,4'-bis(hydroxymethyl)biphenyl-bis(ethyl carbonate) (0.6 g. or 5 mol percent)
Catalyst: 0.3 cc. Ti butoxide solution
Time:
   I Stage, 35 minutes, 250° C.
   II Stage, 40 minutes, 250° C.
Remarks:
(1) Colorless melt at 250° C.
(2) Crystallized rapidly to a white porcelain-like product
(3) Fibers could be cold drawn
(4) Intrinsic viscosity 0.47
(5) Melting point 215° C.

*Example 51.—90% ethyl $Z_{12}$ plus 10% ethyl $Z_{21}$*

Reactants:
   1,4-bis($\beta$-hydroxyethyl)benzene-bis(ethyl carbonate) (9.3 g. or 90 mol percent)
   4,4'-bis(hydroxymethyl)biphenyl-bis(ethyl carbonate) (1.2 g. or 10 mol percent)
Catalyst: 0.3 cc. Ti butoxide solution
Time:
   I Stage, 35 minutes, 250° C.
   II Stage, 40 minutes, 250° C.
Remarks:
(1) Clear melt at 250° C.
(2) Crystallized to a white porcelain-like mass
(3) Fibers could be cold drawn to yield strong threads
(4) Crystallized more slowly than product from Example 50
(5) Intrinsic viscosity 0.46
(6) Melting point 200° C.

*Example 52.—90% ethyl $Z_{12}$ plus 10% ethyl $Z_{21}$*

Reactants:
   1,4-bis($\beta$-hydroxyethyl)benzene-bis(ethyl carbonated) (6.9 g. or 90 mol percent)
   4,4'-bis(hydroxymethyl)biphenyl-bis(ethyl carbonate) (0.9 g. or 10 mol percent)
Catalyst: 3 drops of Ti butoxide (undiluted)
Time:
   I Stage, 20 minutes, 275° C.
   II Stage, 30 minutes, 275° C.
Remarks:
(1) Product similar to Example 51
(2) Intrinsic viscosity less than in Example 51 due to shorter condensation period
(3) Melting point 206° C.

*Example 53.—80% ethyl $Z_{12}$ plus 20% ethyl $Z_{21}$*

Reactants:
   1,4-bis($\beta$-hydroxyethyl)benzene-bis(ethyl carbonate) (8.3 g. or 80 mol percent)
   4,4'-bis(hydroxymethyl)biphenyl-bis(ethyl carbonate) (2.4 g. or 20 mol percent)
Catalyst: 0.3 cc. Ti butoxide solution
Time:
   I Stage, 35 minutes, 250° C.
   II Stage, 40 minutes, 250° C.
Remarks:
(1) Clear smooth melt at 250° C.
(2) Crystallized to a white porcelain-like mass
(3) Crystallized more slowly than the product from Example 51
(4) Was cold drawn to yield tough fibers
(5) Intrinsic viscosity was 0.37
(6) Melting point 180° C.

*Example 54.—80% ethyl $Z_{12}$ plus 20% ethyl $Z_{21}$*

Reactants:
   1,4-bis($\beta$-hydroxyethyl)benzene-bis(ethyl carbonate) (6.2 g. or 20 mol percent)
   4,4'-bis(hydroxymethyl)biphenyl-bis(ethyl carbonate) (1.8 g. or 80 mol percent)
Catalyst: 3 drops Ti butoxide (undiluted)
Time:
   I Stage, 20 minutes, 275° C.
   II Stage, 30 minutes, 275° C.
Remarks:
(1) Product similar to Example 53
(2) Intrinsic viscosity less than in Example 53 due to shorter period of condensation
(3) Melting point 184° C.

*Example 55.—50% ethyl $Z_{12}$ plus 50% ethyl $Z_{21}$*

Reactants:
   1,4-bis($\beta$-hydroxyethyl)benzene-bis(ethyl carbonate) (5.2 g. or 50 mol percent)
   4,4'-bis(hydroxymethyl)biphenyl-bis(ethyl carbonate) (5.9 g. or 50 mol percent)
Catalyst: 0.3 cc. Ti butoxide solution
Time:
   I Stage, 1 hour, 250° C.
   II Stage, 1 hour, 270° C.

21

Remarks:
(1) Clear, smooth melt at 270° C.
(2) Crystallized only with considerable difficulty
(3) Did not crystallize upon cooling slowly to room temperature
(4) Product was a clear, tough polymer
(5) Intrinsic viscosity was 0.51
(6) Melting point, 160° C.

*Example 56.—50% ethyl $Z_{12}$ plus 50% ethyl $Z_{21}$*

Reactants:
    1,4 - bis($\beta$ - hydroxyethyl)benzene - bis(ethyl carbonate) (3.9 g. of 50 mol percent)
    4,4' - bis(hydroxymethyl)biphenyl - bis (ethyl carbonate) (4.5 g. or 50 mol percent)
Catalyst: 3 drops Ti butoxide (undiluted)
Time:
    I Stage, 20 minutes, 275° C.
    II Stage, 30 minutes, 275° C.
Remarks:
(1) Product similar to Example 55
(2) Intrinsic viscosity lower than in Example 55 due to shorter period of condensation
(3) Melting point, 165° C.

*Example 57.—34% ethyl $Z_{12}$ plus 66% ethyl $Z_{21}$*

Reactants:
    1,4 - bis($\beta$ - hydroxyethyl)benzene - bis(ethyl carbonate) (3.9 g. or 34 mol percent)
    4,4' - bis(hydroxymethyl)biphenyl - bis (ethyl carbonate) (9.0 g. or 66 mol percent)
Catalyst: 0.3 cc. Ti butoxide solution
Time:
    I Stage, 1 hour, 250° C.
    II Stage, 45 minutes, 270° C.
Remarks:
(1) Clear melt at 270° C.
(2) Crystallized to a white porcelain-like polymer
(3) Air quenched thread could be cold drawn
(4) Melting point 185° C.

*Example 58.—30% ethyl $Z_{12}$ plus 70% ethyl $Z_{21}$*

Reactants:
    1,4 - bis($\beta$ - hydroxyethyl)benzene - bis(ethyl carbonate) (2.3 g. or 30 mol percent)
    4,4' - bis(hydroxymethyl)biphenyl - bis (ethyl carbonate) (6.3 g. or 70 mol percent)
Catalyst: 3 drops Ti butoxide (undiluted)
Time:
    I Stage, 20 minutes, 275° C.
    II Stage, 30 minutes, 275° C.
Remarks:
(1) Clear melt at 275° C.
(2) Crystallized to white crystalline polymer
(3) Theads formed were quenched in air
(4) Intrinsic viscosity 0.30
(5) Melting point, 217° C.

*Example 59.—20% ethyl $Z_{12}$ plus 80% ethyl $Z_{21}$*

Reactants:
    1,4 - bis($\beta$ - hydroxyethyl)benzene - bis(ethyl carbonate) (1.5 g. or 20 mol percent)
    4,4' - bis(hydroxymethyl)biphenyl - bis (ethyl carbonate) (7.2 g. or 80 mol percent)
Catalyst: 3 drops Ti butoxide (undiluted)
Time:
    I Stage, 20 minutes, 275° C.
    II Stage, 30 minutes, 275° C.
Remarks:
(1) Similar to product of Example 58
(2) Intrinsic viscosity 0.25
(3) Melting point, 222° C.

22

*Example 60.—10% ethyl $Z_{12}$ plus 90% ethyl $Z_{21}$*

Reactants:
    1,4 - bis($\beta$ - hydroxyethyl)benzene - bis(ethyl carbonate) (0.77 g. or 10 mol percent)
    4,4' - bis(hydroxymethyl)biphenyl - bis (ethyl carbonate) (8.1 g. or 90 mol percent)
Catalyst: 3 drops Ti butoxide (undiluted)
Time:
    I Stage, 20 minutes, 275° C.
    II Stage, 30 minutes, 275° C.
Remarks:
(1) Product similar to Examples 57, 58, 59 but crystallized more quickly
(2) Intrinsic viscosity, 0.24
(3) Melting point, 242.5° C.

*Example 61.—5% ethyl $Z_{12}$ plus 95% ethyl $Z_{21}$*

Reactants:
    1,4 - bis($\beta$ - hydroxyethyl)benzene - bis(ethyl carbonate) (0.5 g. or 5 mol percent)
    4,4' - bis(hydroxymethyl)biphenyl - bis (ethyl carbonate) (11.1 g. or 95 mol percent)
Catalyst: 0.3 cc. Ti butoxide solution
Time:
    I Stage, 1 hour, 250° C.
    II Stage, 45 minutes, 270° C.
Remarks:
(1) Clear smooth melt at 270° C.
(2) Crystallized to a white porcelain-like polymer
(3) Threads quenched in air could be cold drawn to tough fibers
(4) Intrinsic viscosity was 0.29
(5) Melting point 240° C.

*Example 62.—5% ethyl $Z_{12}$ plus 95% ethyl $Z_{21}$*

The procedure described in Example 61 was repeated exactly except that 3 drops of Ti ethoxide was used as the catalyst in lieu of the solution of Ti butoxide. The product was essentially identical to Example 61.

*Example 63.—5% ethyl $Z_{12}$ plus 95% ethyl $Z_{22}$*

Reactants:
    4,4' - bis - ($\beta$ - hydroxyethyl) - biphenyl - bis-(ethyl carbonate) (12.2 g. or 95 mol percent)
    1,4-bis - ($\beta$-hydroxymethyl) - benzene-bis(ethyl carbonate) (0.52 g. or 5 mol percent)
Catalyst: 0.3 cc. Ti butoxide solution
Time:
    I Stage, 30 minutes, 270° C.
    II Stage, 30 minutes, 270° C.
Remarks:
(1) At 270° C. there was partial crystallization
(2) At 270° C. the partial melt was stiff, however, fibers could be drawn
(3) Upon cooling, a white, brittle polymer was formed
(4) Intrinsic viscosity 0.50
(5) Melting point 235° C.

*Example 64.—10% ethyl $Z_{12}$ plus 90% ethyl $Z_{22}$*

Reactants:
    4,4' - bis - ($\beta$ - hydroxyethyl) - biphenyl - bis - (ethyl carbonate) (11.6 g. or 90 mol percent)
    1,4 - bis - ($\beta$ - hydroxyethyl) - benzene - bis - (ethyl carbonate) (1.1 g. or 10 mol percent)
Catalyst: 0.3 cc. Ti butoxide solution
Time:
    I Stage, 30 minutes, 270° C.
    II Stage, 35 minutes, 270° C.
Remarks:
(1) Polymer was stiff at 270° C. and fibers could not be easily pulled from it.
(2) The melt was clear and upon cooling a white, crystalline, hard polymer was found.
(3) Intrinsic viscosity 0.38
(4) Melting point 225° C.

*Example 65.—20% ethyl $Z_{12}$ plus 80% ethyl $Z_{22}$*

Reactants:
    4,4' - bis - ($\beta$ - hydroxyethyl) - biphenyl - bis - (ethyl carbonate) (10.3 g. or 80 mol percent)
    1,4 - bis - ($\beta$ - hydroxyethyl) - benzene - bis - (ethyl carbonate) (2.1 g. or 20 mol percent)

Catalyst: 0.3 cc. Ti butoxide solution

Time:
    I Stage, 30 minutes, 270° C.
    II Stage, 20 minutes, 270° C.

Remarks:
(1) Smooth, clear melt at 270° C.
(2) Threads pulled from the melt crystallized fairly rapidly in air. They were somewhat brittle.
(3) The polymer mass crystallized rapidly to a hard, white, porcelain-like material.
(4) Intrinsic viscosity 0.41
(5) Melting point 200° C.

*Example 66.—50% ethyl $Z_{12}$ plus 50% ethyl $Z_{22}$*

Reactants:
    4,4' - bis - ($\beta$ - hydroxyethyl) - biphenyl - bis - (ethyl carbonate) (8.9 g. or 50 mol percent)
    1,4 - bis - ($\beta$ - hydroxyethyl) - benzene - bis - (ethyl carbonate) (7.2 g. or 50 mol percent)

Catalyst: 0.3 cc. Ti butoxide solution

Time:
    I Stage, 30 minutes, 270° C.
    II Stage, 25 minutes, 270° C.

Remarks:
(1) The polymer crystallized slowly so that it was easily air quenched.
(2) When cooled slowly it set to a white, crystalline, porcelain-like material.
(3) Threads drawn from the melt and quenched in air could be cold drawn.
(4) Intrinsic viscosity 0.46
(5) Melting point less than 150° C.

*Example 67.—80% ethyl $Z_{12}$ plus 20% ethyl $Z_{22}$*

Reactants:
    4,4' - bis - ($\beta$ - hydroxyethyl) - biphenyl - bis - (ethyl carbonate) (2.6 g. or 20 mol percent)
    1,4 - bis - ($\beta$ - hydroxyethyl) - benzene - bis - (ethyl carbonate) (8.3 g. or 80 mol percent)

Catalyst: 0.3 cc. Ti butoxide solution

Time:
    I Stage, 30 minutes, 270° C.
    II Stage, 45 minutes, 270° C.

Remarks:
(1) Clear melt which crystallized to yield a hard, white, porcelain-like polymer
(2) Threads drawn from the melt were quenched in air. They could be cold drawn nicely to yield strong fibers.
(3) The polymer crystallized more rapidly than the one prepared as discussed in Example 66, but more slowly than the one described in Example 65.
(4) Intrinsic viscosity 0.38
(5) Melting point 175° C.

*Example 68.—80% ethyl $Z_{12}$ plus 20% ethyl $Z_{22}$*

The procedure described in Example 67 was repeated exactly except that the reactants and catalyst were employed in 100 times the quantities specified and the following conditions were different.

Time:
    I Stage, 40 minutes, 240° C.
    II Stage, 2.5 hours (with stirring), 265° C.

The product was essentially the same as in Example 67 although it possessed a higher intrinsic viscosity. The melt was extruded as a film having a thickness of 0.05 inch which became satisfactorily quenched in air to form an amorphous product. This film was then drawn in two directions perpendicular to each other along the plane of the film so as to form a molecularly oriented structure which was heat set to produce a sheet or film having excellent properties for use as a wrapping material, photographic emulsion support, electrical insulators, etc. Another portion of this same melt was extruded to form fibers which were cold drawn and heat set to produce molecularly oriented fibers which could be formed into yarn for the manufacture of textile fabrics, etc.

*Example 69.—80% ethyl $Z_{12}$ plus 20% ethyl $Z_{22}$*

The procedure described in Example 68 was repeated except that the catalyst was 30 cc. of Ti ethoxide solution. The product obtained was essentially the same.

*Example 70.—80% ethyl $Z_{12}$ plus 20% ethyl $Z_{22}$*

The procedure described in Example 68 was repeated except that the catalyst was 1.0 cc. of Ti tetrachloride instead of the solution of Ti butoxide. The product obtained was essentially the same.

*Example 71.—90% ethyl $Z_{12}$ plus 10% ethyl $Z_{22}$*

Reactants:
    4,4' - bis - ($\beta$ - hydroxyethyl) - biphenyl - bis - (ethyl carbonate (1.3 g. or 10 mol percent)
    1,4 - bis - ($\beta$ - hydroxyethyl) - benzene - bis - (ethyl carbonate) (9.3 g. or 90 mol percent)

Catalyst: 0.3 cc. Ti butoxide solution

Time:
    I Stage, 30 minutes, 270° C.
    II Stage, 45 minutes, 270° C.

Remarks:
(1) Clear melt at 270° C.
(2) Crystallized faster than the product described in Example 67.
(3) Polymer could be quenched readily
(4) Intrinsic viscosity 0.58
(5) Melting point 190° C.

*Example 72.—95% ethyl $Z_{12}$ plus 5% ethyl $Z_{22}$*

Reactants:
    4,4' - bis - ($\beta$ - hydroxyethyl) - biphenyl - bis - (ethyl carbonate) (0.62 g. or 5 mol percent)
    1,4 - bis - ($\beta$ - hydroxyethyl) - benzene - bis - (ethyl carbonate) (9.8 g. or 95 mol percent)

Catalyst: 0.3 cc. Ti butoxide solution

Time:
    I Stage, 30 minutes, 270° C.
    II Stage, 35 minutes, 270° C.

Remarks:
(1) Smooth, clear melt at 270° C.
(2) Threads drawn from the melt crystallized fairly rapidly in the air.
(3) Mass of polymer crystallized to a hard, somewhat brittle, porcelain-like mass
(4) Intrinsic viscosity 0.43
(5) Melting point 213° C.

*Example 73.—95% ethyl $Z_{12}$ plus 5% ethyl $Z_{22}$*

The procedure described in Example 72 was repeated exactly except that 0.1 g. of the dioxane complex of titanium tetrachloride was employed as the catalyst. The polymer obtained was essentially identical to that of Example 72.

*Example 74.— 95% ethyl $Z_{12}$ plus 5% ethyl $Z_{202}$*

Reactants:
    1,4-bis($\beta$-hydroxyethyl)benzene-bis(ethyl carbonate) (9.8 g. or 95 mol percent)
    4,4'-bis($\beta$-hydroxyethoxy)biphenyl-bis(ethyl carbonate) (0.66 g. or 5 mol percent)

Catalyst: 0.3 cc. Ti butoxide solution

Time:
    I Stage, 40 minutes, 250° C.
    II Stage, 1.25 hours, 250° C.

Remarks:
(1) Clear, colorless melt at 250° C.
(2) Crystallized to white porcelain-like polymer
(3) Threads drawn from melt crystallized in air
(4) Soluble in 60:40 phenol:tetrachloroethane
(5) Intrinsic viscosity 0.59
(6) Melting point 210° C.

*Example 75.—90% ethyl $Z_{12}$ plus 10% ethyl $Z_{202}$*

Reactants:
    1,4-bis($\beta$-hydroxyethyl)benzene-bis(ethyl carbonate) (9.3 g. or 90 mol percent)
    4,4'-bis($\beta$-hydroxyethoxy)biphenyl-bis(ethyl carbonate) (1.4 g. or 10 mol percent)
Catalyst: 0.3 cc. Ti butoxide solution
Time:
    I Stage, 40 minutes, 250° C.
    II Stage, 1.25 hours, 250° C.
Remarks:
(1) Clear melt at 250° C.
(2) Crystallized more slowly than the product from Example 74.
(3) Threads drawn from the melt were less crystalline and as a result they cold drew more satisfactorily.
(4) Soluble in 60:40 phenol:tetrachloroethane
(5) Intrinsic viscosity 0.71
(6) Melting point 200° C.

*Example 76.—80% ethyl $Z_{12}$ plus 20% ethyl $Z_{202}$*

Reactants:
    1,4-bis($\beta$-hydroxyethyl)benzene-bis(ethyl carbonate) (8.3 g. or 80 mol percent)
    4,4'-bis($\beta$-hydroxyethoxy)biphenyl-bis(ethyl carbonate) (2.8 g. or 20 mol percent)
Catalyst: 0.3 cc. Ti butoxide solution
Time:
    I Stage, 40 minutes, 250° C.
    II Stage, 1.25 hours, 250° C.
Remarks:
(1) Clear melt at 250° C.
(2) Crystallized more slowly than the product from Example 75
(3) Threads drawn from the melt were cold drawn into tough fibers.
(4) Soluble in 60:40 phenol:tetrachloroethane
(5) Intrinsic viscosity 0.59
(6) Melting point, 180° C.

*Example 77.—80% ethyl $Z_{12}$ plus 20% ethyl $Z_{202}$*

The procedure described in Example 76 was repeated exactly except that the reactants and catalyst were employed in 100 times the quantities specified and the following conditions were different.

Time:
    I Stage, 50 minutes, 245° C.
    II Stage, 1.5 hours (with stirring), 260° C.

The product was essentially the same as in Example 76 although it possessed a higher intrinsic viscosity. The melt was extruded as a film having a thickness of 0.05 inch which became satisfactorily quenched in air to form an amorphous product. This film was then drawn in two directions perpendicular to each other along the plane of the film so as to form a molecularly oriented structure which was heat set to produce a sheet or film having excellent properties for use as a wrapping material, photographic emulsion support, electrical insulator, etc.

*Example 78.—50% ethyl $Z_{12}$ plus 50% ethyl $Z_{202}$*

Reactants:
    1,4-bis($\beta$-hydroxyethyl)benzene-bis(ethyl carbonate) (5.2 g. or 50 mol percent)
    4,4'-bis($\beta$-hydroxyethoxy)biphenyl-bis(ethyl carbonate) (6.6 g. or 50 mol percent)
Catalyst: 0.3 cc. Ti butoxide solution
Time:
    I Stage, 40 minutes, 250° C.
    II Stage, 1.25 hours, 250° C.
Remarks:
(1) Clear melt at 250° C.
(2) Crystallized less rapidly than the products from the preceding examples
(3) The polymer was tough and could be cold drawn.
(4) Soluble in 60:40 phenol:tetrachloroethane
(5) Intrinsic viscosity, 0.51
(6) Melting point, 110° C.

*Example 79.—25% ethyl $Z_{12}$ plus 75% ethyl $Z_{202}$*

Reactants:
    1,4-bis($\beta$-hydroxyethyl)benzene-bis(ethyl carbonate) (2.6 g. or 25 mol percent)
    4,4'-bis($\beta$-hydroxyethoxy)biphenyl-bis(ethyl carbonate) (10.4 g. or 75 mol percent)
Catalyst: 0.3 cc. Ti butoxide solution
Time:
    I Stage, 40 minutes, 250° C.
    II Stage, 1.25 hours, 250° C.
Remarks:
(1) More crystalline than the product from Example 78 and also more brittle in the crystalline state
(2) Soluble in 60:40 phenol:tetrachloroethane
(3) Intrinsic viscosity 0.55
(4) Melting point 165° C.

*Example 80.—5% ethyl $Z_{12}$ plus 95% ethyl $Z_{202}$*

Reactants:
    1,4-bis($\beta$-hydroxyethyl)benzene-bis(ethyl carbonate) (0.5 g. or 5 mol percent)
    4,4'-bis($\beta$-hydroxyethoxy)biphenyl-bis(ethyl carbonate) (13.2 g. or 95 mol percent)
Catalyst: 0.3 cc. Ti butoxide solution
Time:
    I Stage, 40 minutes, 250° C.
    II Stage, 1.25 hours, 250° C.
Remarks:
(1) Product was soluble in 60:40 phenol:tetrachloroethane
(2) Polymer crystallized to a somewhat brittle product
(3) Intrinsic viscosity, 0.47
(4) Melting point 205° C.

The interpolycarbonates of this invention can be prepared employing other catalysts and other reaction conditions in a manner analogous to that described in the preceding examples within the scope of the ranges and limits set forth hereinbefore.

The photographic films which can be produced according to this invention advantageously comprise a film support prepared from one of the above-described interpolycarbonates upon which is deposited one or more layers of a silver halide emulsion which can contain appropriate sensitizers or other additives to suit the intended photographic use.

We claim:
1. A process for preparing an interpolycarbonate which comprises (A) co-condensing a mixture consisting of at least 5 mole percent of a primary bis-(carbonate) monomer having the following formula:

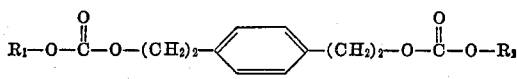

wherein $R_1$ and $R_2$ each represents a radical selected from the group consisting of lower alkyl radicals containing from 1 to 4 carbon atoms and aryl radicals of the benzene series containing from 6 to 8 carbon atoms, together with at least 5 mole percent of a copolymerizable bis-(carbonate) monomer selected from the group consisting of those having the following formulas:

| Chemical Formula | Designation |
|---|---|
| R₁O—CO—O—R₃—O—CO—OR₂ | (a) |
| R₁O—CO—O—(CH₂)ₓ—O—⟨benzene⟩—O—(CH₂)ₓ—O—CO—OR₂ | (b) |
| R₁O—CO—O—(CH₂)ₓ—O—⟨benzene⟩—SO₂—⟨benzene⟩—O—(CH₂)ₓ—O—CO—OR₂ | (c) |
| R₁O—CO—O—CH₂—⟨benzene⟩—CH₂—O—CO—OR₂ | (d) |
| R₁O—CO—O—CH₂—⟨biphenyl⟩—CH₂—O—CO—OR₂ | (e) |
| R₁O—CO—O—(CH₂)ₓ—⟨biphenyl⟩—(CH₂)ₓ—O—CO—OR₂ | (f) |
| R₁O—CO—O—(CH₂)ₓ—O—⟨biphenyl⟩—O—(CH₂)ₓ—O—CO—OR₂ | (g) | wherein $R_1$ and $R_2$ each represents a radical selected from the group consisting of lower alkyl radicals containing from 1 to 4 carbon atoms and aryl radicals of the benzene series containing from 6 to 8 carbon atoms and $R_3$ represents an alkylene radical containing from 4 to 10 carbon atoms, (a) and (b) being used in amounts up to 50 mole percent, (c) being used in an amount up to 20 mole percent, and (d), (e) and (f) and (g) being used in amounts up to 95 mole percent, (B) in the presence of an ester-interchange catalyst containing titanium as the metallic element, which catalyst is selected from the group consisting of $Ti(OR')_4$, and ether complexes of $TiX_4$ wherein the ether complexes are derived by reacting $TiX_4$ with an ether selected from the group consisting of aliphatic and alicyclic ethers containing from 2 to 12 carbon atoms, and wherein R' represents an alkyl radical containing from 1 to 18 carbon atoms and X represents a halogen atom, (C) at an elevated temperature, (D) the condensation being conducted in an inert atmosphere and (E) the latter part of the condensation being conducted at a very low pressure.

2. A process as defined in claim 1 wherein the elevated temperature during the course of the condensation is in excess of about 225° C.

3. A process as defined in claim 2 wherein the ester-interchange catalyst is employed in an amount of from about 0.005% to about 0.2% based on the weight of the mixture of bis(carbonate) monomers.

4. A process as defined in claim 3 wherein the low pressure is less than about 1 mm. of Hg pressure.

5. A process as defined in claim 4 wherein the primary bis(carbonate) monomer is 1,4-bis(β-hydroxyethyl)-benzene-bis-(ethyl carbonate).

6. A process as defined in claim 5 wherein the copolymerizable bis-(carbonate) monomer is 1,5-pentanediol-bis-(ethyl carbonate).

7. A process as defined in claim 5 wherein the copolymerizable bis-(carbonate) monomer is 1,4-bis(β-hydroxyethoxy)-benzene-bis-(ethyl carbonate).

8. A process as defined in claim 5 wherein the copolymerizable bis-(carbonate) monomer is 4,4'-bis-(β-hydroxyethoxy)-diphenylsulfone-bis-(ethyl carbonate).

9. A process as defined in claim 5 wherein the copolymerizable bis-(carbonate) monomer is 4,4'-bis-(hydroxymethyl)-biphenyl-bis(ethyl carbonate).

10. A process as defined in claim 5 wherein the copolymerizable bis-(carbonate) monomer is 4,4'-bis(β-hydroxyethoxy)-biphenyl-bis(ethyl carbonate).

11. Linear highly polymeric crystalline interpolycarbonates containing at least 5 mole percent of the following repeating units:

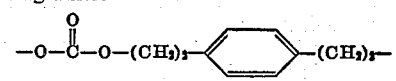

wherein the units are interspersed with at least 5 mole percent of a copolymerized unit selected from the group consisting of those having the following formulas:

| Chemical Formula | Designation |
|---|---|
| —O—CO—O—R₃— | (a) |
| —O—CO—O—(CH₂)ₓ—O—⟨benzene⟩—O—(CH₂)ₓ— | (b) |
| —O—CO—O—(CH₂)ₓ—O—⟨benzene⟩—SO₂—⟨benzene⟩—O—(CH₂)ₓ— | (c) |
| —O—CO—O—CH₂—⟨benzene⟩—CH₂— | (d) |
| —O—CO—O—CH₂—⟨biphenyl⟩—CH₂— | (e) |
| —O—CO—O—(CH₂)ₓ—⟨biphenyl⟩—(CH₂)ₓ— | (f) |
| —O—CO—O—(CH₂)ₓ—O—⟨biphenyl⟩—O—(CH₂)ₓ— | (g) | wherein $R_3$ represents an alkylene radical containing from 4 to 10 carbon atoms, (a) and (b) being present in amounts up to 50 mole percent, (c) being present in an amount up to 20% and (d), (e), (f) and (g) being present in amounts up to 95% and one end of each polymer molecule contains an $R_1$— radical attached to the terminal free oxygen bond and the other end of each polymer molecule contains an —O—CO—O—$R_2$ radical attached to the terminal free methylene bond, wherein $R_1$ and $R_2$ each represents a radical selected from the group consisting of lower alkyl radicals containing from 1 to 4 carbon atoms and aryl radicals of the benzene series containing from 6 to 8 carbon atoms.

12. An interpolycarbonate as defined in claim 11 wherein the copolymerized unit is present to the extent of from about 10 to 30% and has the formula:

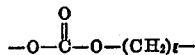

13. An interpolycarbonate as defined in claim 11 wherein the copolymerized unit is present to the extent of from about 10 to 30% and has the formula:

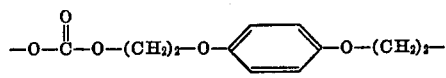

14. An interpolycarbonate as defined in claim 11 wherein the copolymerized unit is present to the extent of from about 10% to about 20% and has the formula:

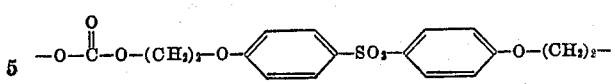

15. An interpolycarbonate as defined in claim 11 wherein the copolymerized unit is present to the extent of from about 10% to about 90% and has the formula:

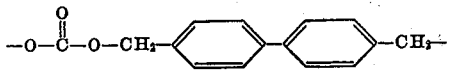

16. An interpolycarbonate as defined in claim 11 wherein the copolymerized unit is present to the extent of from about 10% to about 90% and has the formula:

17. Fiber composed essentially of an interpolycarbonate as defined in claim 11.

18. Film composed essentially of an interpolycarbonate as defined in claim 11.

References Cited in the file of this patent
UNITED STATES PATENTS 2,210,817    Peterson _____ Aug. 6, 1940